Dec. 14, 1926.

H. B. McDONALD ET AL 1,611,050

MANUFACTURE OF MILLING CUTTERS

Original Filed June 27, 1921

Inventors:
Hiram B. McDonald,
Alfred M. Remington,
by their Attys.

Patented Dec. 14, 1926.

1,611,050

UNITED STATES PATENT OFFICE.

HIRAM B. McDONALD AND ALFRED M. REMINGTON, OF FITCHBURG, MASSACHUSETTS, ASSIGNORS, BY MESNE ASSIGNMENTS, TO SIMONDS SAW AND STEEL COMPANY, OF FITCHBURG, MASSACHUSETTS, A CORPORATION OF MASSACHUSETTS.

MANUFACTURE OF MILLING CUTTERS.

Original application filed June 27, 1921, Serial No. 480,580. Divided and this application filed September 20, 1922. Serial No. 589,357.

This invention relates to an improved method of manufacturing interchangeable and adjustable cutters for use in milling machines, this being a division of our copending application Serial No. 480,580, filed June 27, 1921.

The invention involves forming a blank in the form of an elongate strip of tool metal conforming in transverse sectional contour to either the transverse or the longitudinal contour of the cutter and then cutting off sections of the blank of such length as to form cutters of the desired dimensions.

The invention is illustrated by the accompanying drawing in which—

Figure 1:
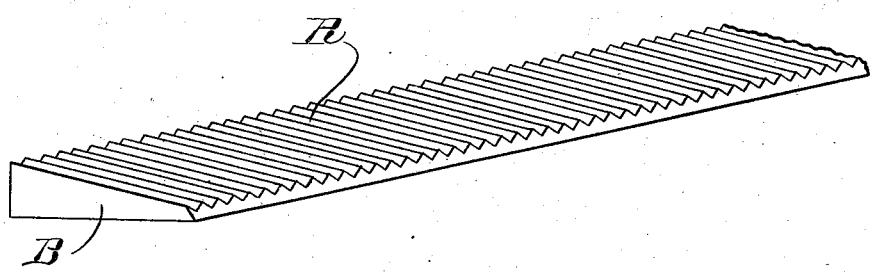
Figure 2:
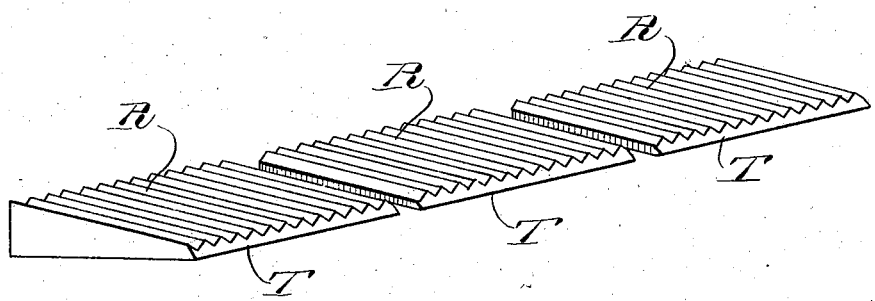

Fig. 1 is a perspective view of a portion of cutter blank according to the invention; and Fig. 2 is a perspective view of three cutters cut from the blank.

The type of cutters chosen to illustrate our improved method of manufacture is disclosed in Fig. 2, one manner of mounting such cutters in a cutter-head being disclosed in the aforesaid application. Cutters T are uniform in size and generally rectangular in plan. Each cutter is of substantially truncated wedge-shape in transverse section and provided upon one side with ribs R each rib being inclined both longitudinally and transversely relatively to the opposite side of the cutter for the purposes set forth in the aforesaid application.

The cutter may be cheaply and conveniently manufactured by first forming an elongate blank B, such as shown in Fig. 1, of any suitable or desired length, whose transverse sectional contour is the same as the transverse sectional contour of the teeth, and then cutting the blank in planes parallel to the ribs R into sections of the desired width. By employing blanks of this character, from which cutters of any desired width may be cut, orders for teeth of various sizes can be promptly filled by cutting off sections of the required width from blank strips carried in stock as the sections when cut need no further machine operation other than the usual sharpening, to adapt them for use in the cutter heads.

From the above it will be apparent that the invention is not limited to the manufacture of the particular type of cutter teeth herein disclosed but is applicable to the manufacture of all cutter teeth and similar articles which are uniform in two dimensions.

We claim:

1. The method of making milling cutters which comprises forming a strip of tool metal having the same sectional contour as the cutter in both transverse and longitudinal planes perpendicular to the strip and having the same dimensions as the cutter along one of said planes, and then cutting off sections of the strip parallel to said one of the planes at intervals equal to the other dimension of the cutters.

2. The method of making milling cutters which comprises forming an elongate strip of tool metal having transverse ribs on one side and having a transverse contour substantially the same as the longitudinal contour of the cutter, and then cutting off transverse sections of the strip parallel to the ribs at intervals substantially equal to the transverse dimension of the cutters.

3. The method of making milling cutters which comprises forming an elongate blank of tool metal having transverse ribs on one side, and forming cutter teeth therefrom by cutting off substantially identical transverse sections of the blank parallel to the ribs.

4. The method of making milling cutters which comprises forming an elongate blank of tool metal having transverse ribs on one side, and tapering in thickness from one longitudinal edge to the other, and forming cutter teeth therefrom by cutting off substantially identical transverse sections of the blank parallel to the ribs.

5. A milling cutter blank generally elongate in form and of substantially uniform or symmetrical transverse cross-section corresponding to the cross-section of the desired milling cutters, said blank being of sufficient length to permit of being cut transversely into a plurality of cutters.

6. A milling cutter blank of substantially rectangular proportions, having a thickness tapering from one longitudinal margin to the other, and transverse ribs upon one side, perpendicular to said longitudinal margins, said blank being of sufficient length to permit of being cut transversely into a plurality of cutters.

7. A blank for use in preparing milling cutter teeth comprising a strip of tool metal of truncated wedge shape in transverse section, the thinner margin of the strip being beveled to form a cutting edge, and a plurality of parallel ribs upon one of the inclined faces of the strip, said ribs extending substantially at right angles to the cutting edge and being uniformly shaped and spaced, the opposite longitudinal faces of each rib being inclined relatively to each other and to the opposite inclined face of the strip, said blank being adapted to be divided transversely to form cutter teeth of desired width.

8. A milling cutter tooth blank comprising a strip of tool metal of substantially truncated wedge shape in transverse section and of a length to produce a plurality of cutter teeth whose transverse contour is like the contour of the blank, the thinner margin of the strip being beveled to form a cutting edge, and a plurality of ribs alternating with grooves extending transversely of the strip for interlocking engagement with teeth and grooves of a cutter head, the grooves in the blank affording weakened portions facilitating the cutting of the blank into teeth of desired widths.

Signed by us at Fitchburg, Massachusetts, this eighteenth day of September, 1922.

HIRAM B. McDONALD.
ALFRED M. REMINGTON.